United States Patent Office 3,778,463
Patented Dec. 11, 1973

3,778,463
AROMATIC α-AMINO ACIDS
Salo Schmul Gronowitz and Uri Michael, Lund, and Berndt Olof Harald Sjoberg, Sodertalje, Sweden, assignors to Astra Lakemedel Aktiebolag, Sodertalje, Sweden
No Drawing. Filed Apr. 29, 1971, Ser. No. 138,747
Claims priority, application Sweden, May 4, 1970, 6,120/70
Int. Cl. C07c 10/06
U.S. Cl. 260—471 A          10 Claims

ABSTRACT OF THE DISCLOSURE

A method for preparing amino acids of the formula

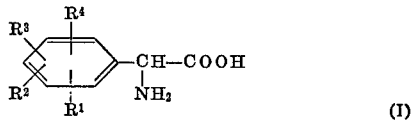

(I)

wherein $R^1$, $R^2$, $R^3$ and $R^4$ are located in positions 2, 3, 4, 5 or 6 on the benzene ring and are the same or different and selected from the class consisting of hydrogen, hydroxy, alkoxy having 1 to 3 carbon atoms, alkyl having 1 to 3 carbon atoms and halogen, provided that at least one of $R^1$, $R^2$, $R^3$ and $R^4$ are selected from the class consisting of hydroxy, alkyl and alkoxy, by reacting a compound of the formula

(II)

with $$CN\text{—}COOR^5 \quad (III)$$

wherein $R^5$ is selected from the group consisting of alkyl having 1-4 carbon atoms monocarbocyclic aryl and dicarbocyclic aryl to obtain a compound of the formula

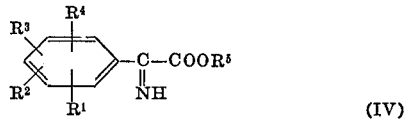

(IV)

and reducing to form a compound of the formula

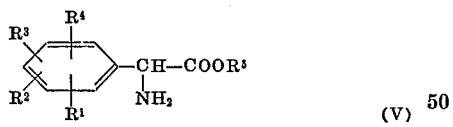

(V)

and hydrolyzing to obtain compound I.

---

This invention relates to substituted aromatic α-amino acids and to a process for their preparation.

Aromatic α-amino acids are usually prepared for example by the Strecker method, whereby a given aldehyde may be converted into an α-amino acid containing one carbon atom more than the parent compound. Many modifications of the Strecker procedure have been introduced for the purpose of increasing the yields and obviating the practical difficulties imposed by handling the highly toxic hydrogen cyanide gas (for review see: J. P. Greenstein and M. Winitz, Chemistry of Amino Aacids, vol. 1, p. 697, John Wiley & Sons, Inc., New York, 1961). Nevertheless due to unavailability of the starting aldehydes the method is often disadvantageous.

A convenient route to α-amino acids is the replacement of the α-halo substituent of an appropriate α-halogen acid with an amino moiety, e.g. direct ammonolysis or condensation with phthalimide or hexamethylenetetramine followed by hydrolysis. However, this method is not suitable when the α-halo compound is difficult to prepare.

According to the present invention we have now found a convenient method for the synthesis of substituted α-aryl-α-amino acids in which readily available phenols, phenol ethers and other substituted benzene compounds are used as a starting material.

It is previously known that poly-phenols can react with alkyl nitriles to give ketimines which are directly hydrolysed to ketones. This reaction, the Hoesch ketone synthesis, proceeds well with many polyphenols but it is not applicable to phenol itself (Organic Reactions, volume V, Chapter 9 and L. F. Fieser and M. Fieser, Advanced Organic Chemistry, 2nd printing, p. 830–1). Various types of nitriles have been used in this ketone synthesis and in one investigation resorsionl was condensed with ethyl cyanoformate with the formation of 2,4-dihydroxyphenyl glyoxylic acid (I. M. Hunsberger and E. D. Amstutz, J. Am. Chem. Soc. 70, 671 (1948)).

It was surprising that according to the present invention we could condense less reactive aromatic hydrocarbons as for example anisole and mesitylene with cyanoformates and furthermore that we could directly hydrogenate the unstable intermediary ketimites to α-amino acid esters in good yields, without any formation of the corresponding phenylglyoxylic acid derivatives.

The α-amino acids prepared according to the present invention are important intermediates in the production of pharmaceuticals as for example penicillins and cephalosporins, as disclosed in Doyle and Nayler, Advances in Drug Research, vol. 1, Academic Press, 1964.

The present invention relates to a method for the preparation of α-amino acids of the general structure I

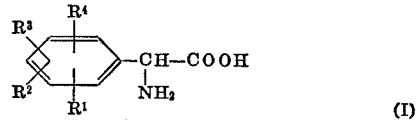

(I)

where $R^1$, $R^2$, $R^3$ and $R^4$ in the positions 2, 3, 4, 5 or 6 in the benzene ring are the same or different and can be hydrogen, hydroxy, alkoxy with 1–3 carbon atoms, alkyl with 1–3 carbon atoms or halogen, provided that at least one of $R^1$, $R^2$, $R^3$ and $R^4$ is selected from the class consisting of hydroxy, alkyl and alkoxy, and in which a compound of the general structure II

(II)

where $R^1$, $R^2$, $R^3$ and $R^4$ are defined as above, is reacted with a compound of the structure III $$NC\text{—}COOR^5 \quad (III)$$

where $R^5$ is alkyl with 1–4 carbon atoms or aryl, to form compound IV

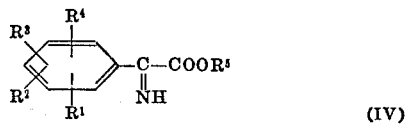

(IV)

or an acid addition salt thereof, which is reduced to form a compound of the structure V

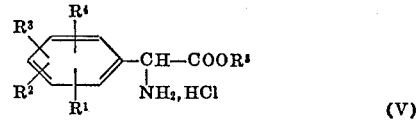

(V)

whereafter this product is hydrolyzed under any suitable hydrolyzing conditions to a compound of the general structure I. The reaction sequence can be formulated as follows:

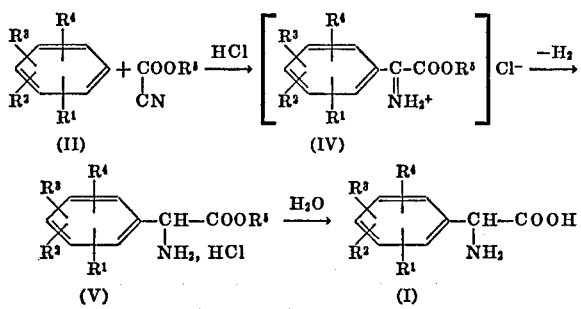

With regard to the groups $R^1$, $R^2$, $R^3$ and $R^4$, the halogen may, for example, be fluorine, chlorine or bromine, but fluorine and chlorine are preferred. Ethoxy, propoxy, ethyl and propyl are mentioned specifically as illustrations of suitable groups. Examples of compounds of the structure I are as follows:

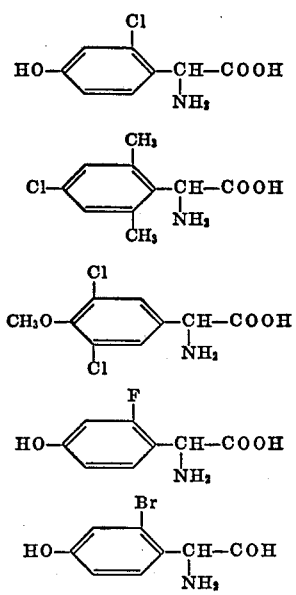

The definition "alkyl" for the group $R^5$ may be illustrated by the radicals methyl, ethyl, propyl, isopropyl, and butyl. The term "aryl" is intended to mean monocarbocyclic and dicarbocyclic compounds such as phenyl and naphthyl. Also phenyl and naphthyl substituted with alkyl containing from 1 to 3 carbon atoms, alkoxy containing from 1 to 3 carbon atoms or halogen such as fluorine, chlorine, bromine and iodine are to be included in the definition "aryl" of the group $R^5$. It should be noted that the radical $R^5$ is split off in the last step of the process to give a carboxyl group, and $R^5$ may also be defined as a group which is easily split off by hydrolysis to yield a carboxyl group. The definition of $R^5$ is not critical for the reaction.

As regards the reaction conditions, the first step of the reaction is carried out in a substantially anhydrous solvent. Of course, traces of water may be present, so long as the reactants and products are not significantly hydrolyzed. The type of catalyst used may be broadly defined as Lewis acid type catalysts or as Friedel-Crafts type catalysts. The molar ratio of the reactants is not critical. Usually about equimolar quantities of the reactants II and III are dissolved in an organic solvent, such as dry ether, preferably in the presence of a catalyst such as zinc chloride, ferric chloride, aluminium chloride or hydrogen chloride.

The hydrogenation of the compound IV to V can be carried out at ordinary or elevated pressure using metal catalysts such as palladium or Raney-nickel. Any of the hydrogenation catalysts might be used. Besides palladium, also platinum and ruthenium may be mentioned. A pressure of up to about 50 atmospheres might be used. The hydrogenation step is in itself an ordinary hydrogenation wherein conventionally used temperatures and pressures are used. The hydrogenation is preferably carried out in the liquid phase, which is the most convenient and most practical manner.

The invention will be further illustrated by the following examples.

EXAMPLE 1

Preparation of oxamethane (ethyl oxamate)

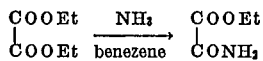

200 g. (1.37 mole) of commercial diethyloxalate were mixed with 500 ml. benzene and while cooling a rapid stream of gaseous ammonia was bubbled in. After 45 min. the white product was filtered off, washed several times with benzene and dried giving 136 g. of oxamethane. The filtrate was treated further with ammonia for another 90 min. giving 12 g. of the product (altogether 148 g. or 92.5% yield) melting at 110–112° C. The NMR spectrum (in DMSO-$d_6$) showed a triplet centered at $\delta=7.25$ p.p.m., a quartet centered at $\delta=4.16$ p.p.m. and a broad peak around $\delta=8$ p.p.m. with relative areas of 3:2:1.5.

EXAMPLE 2

Preparation of ethyl-cyanoformate

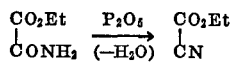

73 g. (0.62 mole) of oxamethane were intimately mixed with 90 g. of phosphorous pentoxide in a 1 litre 3 necked flask. Through the main neck a stainless steel stirrer was introduced and connected to a powerful motor. Another neck was connected to a short distillation system. During constant efficient stirring the mixture was heated to 150–180° and after about 10 min. the raw product started distilling over. The raw product was dried over $MgSO_4$, filtered off and distilled through a 50 cm. long glass-packed column. The product (48 g. or 78% yield) boiled at 115–119° C. The IR showed a sharp nitrile absorption at 2240 cm.$^{-1}$.

EXAMPLE 3

Preparation of ethyl-α-amino-(2,4-dihydroxyphenyl) acetate hydrochloride

Reaction scheme:

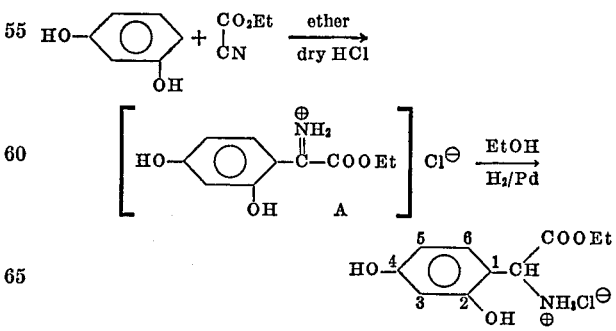

The intermediate immonium salt (A) was prepared according to Amstutz et al., J. Am. Chem. Soc. 70 (1948), p. 671, except that the compound was isolated, 5.5 g. (50 mmoles) of dry resorcinol dissolved in 70 ml. of sodium dried ether and 5.4 g. (54 mmoles) ethylcyanoformate were added. A rapid stream of gaseous dry hydrochloric acid was passed through the mixture for 2 hours with occasional cooling. The clear solution turned yellow and thereafter the immonium salt started to precipitate. A strong stream of dry helium gas was passed through the mixture for 30 min. and the immonium salt was filtered off, washed a few times with dry ether and dried, yielding 11 g. of a pink solid (90% yield). The immonium salt could be kept for at least 8 weeks in a desiccator without degradation.

4 g. of the immonium salt were dissolved in 50 ml. of absolute ethanol and were hydrogenated over 10% Pd/C (300 mg.) for 14 hours at 55–60 p.s.i. hydrogen pressure. The catalyst was filtered off and the alcohol was evaporated yielding the subject compound in quantitative yield.

The NMR spectrum (in DMSO-$d_6$) showed a triplet centered at $\delta = 1.13$ p.p.m. (due to a methyl group), a quartet centered at $\delta = 4.14$ p.p.m. (due to a methylene group), a singlet at $\delta = 5.0$ p.p.m. (due to a methine hydrogen), a quartet centered at $\delta = 6.25$ p.p.m. (due to 5 hydrogen on the aromatic nucleus, with $J_{ortho} = 9$ c./s. and $J_{meta} \approx 2.5$ c./s., a doublet centered at $\delta = 6.50$ p.p.m. (due to a 3-hydrogen on the aromatic ring), a doublet at $\delta = 7.08$ p.p.m. (due to 6 hydrogen) and a broad peak around $\delta = 9$ p.p.m. (due to the ammonium and hydroxylic hydrogens) with relative areas of 3:2:1:2:1:4.8.

The product was recrystallized from a mixture of ethyl acetate-ethanol. Composition for $C_{10}H_{14}ClNO_4$:

Calcd. (percent): C, 48.49; H, 5.70; N, 5.65; O, 25.84
Found (percent): C, 47.50; H, 5.46; N, 5.78; O, 25.40

This compound has no distinct melting point since it starts darkening at about 170° C. but keeps its crystalline form. The decomposition is fast at about 210–20° C.

EXAMPLE 4

Preparation of ethyl-α-amino-(2,4,6-trimethylphenyl) acetate hydrochloride 3.34 g. (25 mmoles) of AlCl$_3$ and 12 g. (0.1 mole) of sodium dried mesitylene were added to 20 ml. of dry chlorobenzene. Thereafter 2.5 g. (25 mmoles) of ethylcyanoformate were added. When the exothermic reaction subsided dry gaseous hydrochloric acid was passed through the mixture while it was heated at 40° C. After 4½ hours the brown mixture was dissolved in 150 ml. of absolute ethanol (with cooling) and was hydrogenated over 10% Pd/C for 15 hours at 60 p.s.i. hydrogen pressure (80% of the calculated amount of hydrogen was taken up during the first 45 min.). The catalyst was filtered off and the solvents were evaporated. Dilute HCl was added to the resulting gum. The aqueous acidic phase was extracted several times with benzene, dried over MgSO$_4$ and was evaporated yielding 1.8 g. of a semi-solid product. Ether was added and 950 mg. of the product were precipitated. The aqueous acidic phase was evaporated to dryness and extracted several times with hot chloroform. The combined chloroform extracts were evaporated yielding 4.40 g. of the subject compound (together 5.35 g. or 83% yield).

The NMR spectrum (in DMSO-$d_6$) showed a triplet centered at $\delta = 1.16$ p.p.m. (due to a methyl proton on the ester function), two singlets at $\delta = 2.24$ p.p.m. and at $\delta = 2.34$ p.p.m. (due to the three methyl groups on the nucleus), a quartet centered at $\delta = 4.16$ p.p.m. (due to a methylene proton), a singlet at $\delta = 5.41$ p.p.m. (due to methine hydrogen) and a singlet at $\delta = 6.95$ p.p.m. (due to 3 and 5 hydrogens on the aromatic nucleus) with relative areas of 3:9:2:1:2.

The product recrystallized from acetone had a sublimation point at 221–222° C. Composition for $$C_{13}H_{20}ClNO_2$$

(M.W. 257.768):

Calcd. (percent): C, 60.57; H, 7.82; Cl, 13.75; N, 5.43; O, 12.41
Found (percent): C, 60.80; H, 7.98; Cl, 14.10; N, 5.75; O, 12.30

EXAMPLE 5

Preparation of ethyl-α-amino(p-methoxyphenyl) acetate hydrochloride

Reaction scheme:

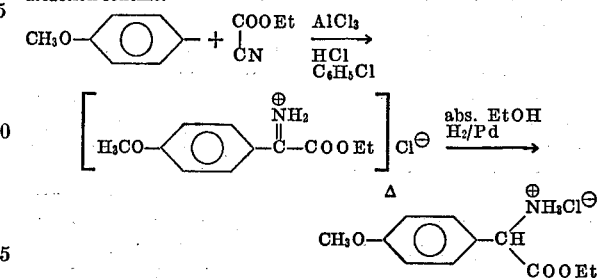

6.70 g. (50 mmoles) finely powdered AlCl$_3$ were added to 20 ml. dry chlorobenzene and 5.40 g. (50 mmoles) of sodium dried anisole were added to the mixture. In a few minutes the mixture turned deep green. Then 5 g. (50 mmoles) of ethyl cyanoformate were added and dry HCl gas bubbled through. After a few minutes the mixture turned brown-red. The reaction mixture was heated to 50–55° C. for 8 hours while a slow stream of dry HCl was passed through. After cooling and addition of 80–100 ml. abs. ethanol the homogeneous reaction mixture was transferred to a hydrogenation bottle and was hydrogenated for 12 hours with 400 mg. 10% Pd/C at 4 atm. hydrogen pressure. The catalyst was filtered off and the alcohol was completely evaporated. Dilute HCl was added and the mixture heated for a few minutes on steam bath and then extracted with ether and benzene. After drying and evaporation 1.5 g. oil were obtained from which by treatment with dry ether 150 mg. of the desired compound was precipitated. The aqueous acidic phase was evaporated to dryness. It is very important to dry the mixture completely. After most of the water had evaporated, remaining traces of water are removed by one or more additions of abs. ethanol, followed by evaporation. When the mixture is not absolutely dry the extraction with chloroform is extremely difficult. The resulting white-yellow solid product was extracted with boiling chloroform for 1 hour and the chloroform extract evaporated to dryness, yielding 9.1 g. of a solid product (at together 9.25 g. or 75% yield). The NMR (in DMSO-$d_6$) showed a triplet centered at $\delta = 1.15$ p.p.m. due to a methyl group (relative area of 3), sharp singlet at $\delta = 3.74$ p.p.m. due to the methoxy group (relative area of 3), a quartet centered at $\delta = 4.17$ p.p.m. due to methylene group on the ester (relative area of 2), a singlet at $\delta = 5.08$ p.p.m. due to a methine hydrogen (relative area of 1) and two doublets centered at $\delta = 7.0$ p.p.m. and $\delta = 7.47$ p.p.m. with J=8.5–9 c./s. due to hydrogen atoms on the aromatic ring (relative area of 4) and a broad absorption around $\delta = 8.65$ p.p.m. due to ammonium hydrogen atoms.

The resulting product after recrystallization from a mixture of ethyl acetate ethanol gave a M.P.—159–160° C. Composition for $C_{11}H_{16}ClNO_3$ (M.W. 245.714):

Calcd. (percent): C, 53.77; H, 6.56; Cl, 14.43; N, 5.70; O, 19.53.
Found (percent): C, 53.40; H, 6.73; Cl, 14.30; N, 5.70; O, 19.30.

EXAMPLE 6

Preparation of α-amino-(p-hydroxyphenyl)acetic acid

Reaction scheme:

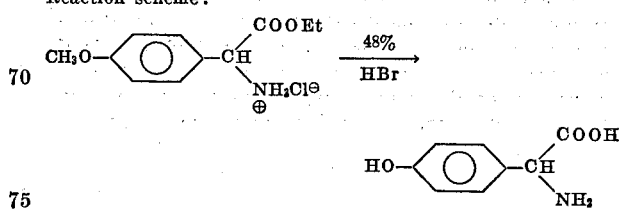

860 mg. of ethyl-α-amino-(p-methoxyphenyl) acetate hydrochloride were dissolved in 25 ml. of 48% hydrobromic acid and the mixture was gently refluxed for 4½ hours under a nitrogen atmosphere. After cooling, the hydrobromic acid was evaporated and the residual solid was treated with chloroform whereupon the light colored solid was filtered off and dried, yielding 850 mg. (98% yield) of the hydrobromide of the product melting at 217–218° (decomp.). The NMR spectrum of the hydrobromide (in DMSO-d$_6$) showed a singlet at δ=4.96 p.p.m. (due to methine hydrogen), two doublets at δ=6.80 p.p.m. and δ=7.25 p.p.m. (with J$_{ortho}$=9 c./s., due to aromatic hydrogen atoms with relative areas of 1:2:2. The ammonium hydrogen atoms and the hydroxyl hydrogens gave a broad peak around δ=8.50 p.p.m.

700 mg. of the hydrobromide were dissolved in 15 ml. water and neutralized with dilute NaOH solution. At pH 7 a white solid precipitated which was filtered off and dried giving 330 mg. of the above identified compound, melting point 215–16° C. After one crystallization from ethanol-water the compound had a melting point of 219–220° C.

EXAMPLE 7

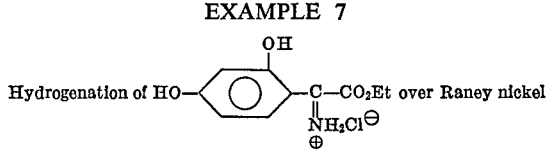

1–2 g. of Raney nickel (LS 532 Liljeholmens Stearinfabriks AB, Stockholm, Sweden) were washed a few times with abs. ethanol whereupon the alcohol was decanted off. Then 2.5 g. of the immonium salt dissolved in 100 ml. abs. ethanol were added and the mixture hydrogenated at 50 p.s.i. hydrogen pressure for 15 hours. The catalyst was removed and washed with alcohol. After evaporation of the solvent in vacuum the amine hydrochloride identical in every respect with the compound obtained by hydrogenation over palladized carbon was obtained in quantitative yield.

EXAMPLE 8

Preparation of ethyl - α - amino(3,5-dimethyl-4-methoxyphenyl)-acetate hydrochloride Reaction scheme:

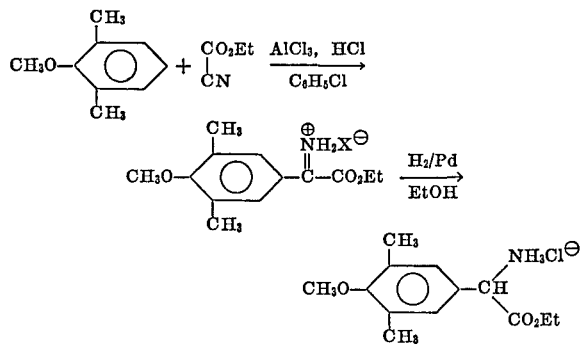

To 5.44 g. (0.04 mole) of 2,6-dimethyl anisole (Gattermann, L., Ann. 357, 363 (1907)) in 20 ml. dry chlorobenzene were added 5.32 g. (0.04 mole) anhydrous aluminium chloride. When the reaction subsided dry gaseous hydrogen chloride was passed through the mixture. 4.5 g. (0.045 mole) of ethyl cyanoformate in 20 ml. of dry chlorobenzene were added dropwise within 5 hours at 60–65° C. under a slow stream of dry hydrogen chloride. After stirring for another hour under these conditions the reaction mixture was dissolved in 100 ml. of absolute ethanol and hydrogenated at 4 atm. of hydrogen in the presence of 10% palladized carbon (200 mg.) for 15 hours. The catalyst was filtered off and the solvents evaporated in vacuum. The residue was disolved in dilute hydrochloric acid and extracted several times with ether. The aqueous phase was evaporated to dryness and then extracted several times with hot chloroform and evaporated thereby yielding 3.6 g. of ethyl-α-amino-(3,5-dimethyl - 4 - methoxyphenyl) - acetate hydrochloride. The remaining solid was extracted continuously with hot chloroform for another 24 hours and evaporation of the chloroform yielded another 500 mg. of the same product (altogether 4.1 g. or 37% yield). The NMR spectrum (in DMSO-d$_6$) showed a triplet at δ$_{CH_3(ester)}$=1.17 p.p.m., a singlet at δ$_{3,5(CH_3)}$=2.23 p.p.m., a singlet at δ$_{4(OCH_3)}$=3.67 p.p.m., a quartet at δ$_{CH_2\ (ester)}$=4.20 p.p.m., a singlet at δ$_{α-CH}$=5.00 p.p.m., a singlet at δ$_{2,6}$=7.22 p.p.m. and a broad absorption at δ≈9 p.p.m.
$\overset{+}{NH_3}$ The compound slowly decomposing at 186–189° was recrystallized from acetone. Composition for C$_{13}$H$_{20}$ClNO$_3$ (M. Wt. 273.768):

Calcd. (percent): C, 57.03; H, 7.36; Cl, 12.95; N, 5.12; O, 17.53.

Found (percent): C, 56.90; H, 7.36; Cl, 13.00; N, 5.05; O, 17.90.

EXAMPLE 9

Preparation of 2-(3,5-dimethyl-4-hydroxyphenyl)-glycine hydrobromide

Reaction scheme:

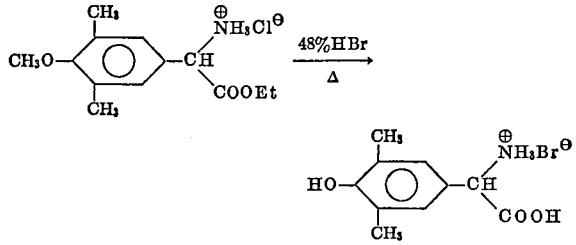

240 mg. of ethyl-α-amino-(3,5-dimethyl-4-methoxy) acetate hydrochloride were dissolved in 10 ml. of 48% HBr and refluxed for 3–3½ hours under nitrogen. The hydrogen bromide was evaporated and the residue treated with chloroform. The resulting solid was filtered off and further purified by washing with ether and was then dried, yielding 230 mg. of 2-(3,5-dimethyl-4-hydroxyphenyl)-glycine hydrobromide. The NMR spectrum (in DMSO-d$_6$) showed a singlet at δ$_{3,5(CH_3)}$=2.20 p.p.m., a singlet at δ$_{α-CH}$=4.90 p.p.m., a singlet at δ$_{2,6}$=7.12 p.p.m. and a broad absorption δ =6.5 p.p.m. and 8.50 p.p.m.
$\overset{\oplus}{NH_3}$, COOH, OH It will be noted that in a particular embodiment of the invention, the group para to the acetate radical is represened by R$^6$ which is defined as an alkoxy having 1 to 3 carbon atoms. The radical R$^6$ may be specifically illustrated by ethoxy and propoxy since other formations and modifications of the invention will be apparent to those skilled in the art and are entitled to be included within the scope of the following claims.

What is claimed is:

1. A compound of the formula

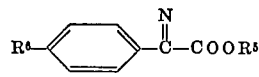

wherein R$^5$ is selected from the group consisting of alkyl having 1–4 carbon atoms and monocarbocyclic aryl and dicarbocyclic aryl and R$^6$ is an alkoxy group having 1 to 3 carbon atoms.

2. A compound according to claim 1 wherein R$^6$ is methoxy.

3. A hydrochloride of the compound of claim 2 wherein R$^5$ is ethyl.

4. A compound of the formula

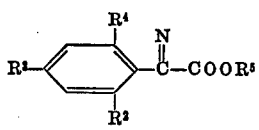

wherein $R^5$ is selected from the group consisting of alkyl having 1–4 carbon atoms and monocarbocyclic aryl and dicarbocyclic aryl and $R^2$, $R^3$, and $R^4$ are selected from the group consiting of alkyl having 1–3 carbon atoms.

5. A compound according to claim 4 wherein $R^2$, $R^3$, and $R^4$ are methyl.

6. A hydrochloride of the compound of claim 5 wherein $R^5$ is ethyl.

7. A compound of the formula

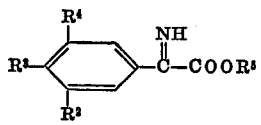

wherein $R^5$ is selected from the group consiting of alkyl having 1–4 carbon atoms and monocarbocyclic aryl and dicarbocyclic aryl and $R^3$ is selected from the group consisting of alkoxy having 1–3 carbon atoms and $R^2$ and $R^4$ are selected from the group consisting of alkyl having 1–3 carobn atoms.

8. A compound according to claim 7 wherein $R^3$ is methoxy.

9. A compound according to claim 7 wherein both $R^2$ and $R^4$ are methyl.

10. A hydrochloride of the compound of claim 7, wherein $R^2$ and $R^4$ are methyl, $R^3$ is methoxy and $R^5$ is ethyl.

References Cited

Royals, E. E., Advanced Organic Chemistry (1961), pub. by Prentice-Hall—New Jersey (QD 251R68C–6), pp. 569, 606, 668 and 669.

LORRAINE A. WEINBERGER, Primary Examiner

L. A. THAXTON, Assistant Examiner

U.S. Cl. X.R.
260—518 R, 519

PO-1050
(5/69)

UNITED STATES PATENT OFFICE
CERTIFICATE OF CORRECTION

Patent No. 3,778,463      Dated December 11, 1973

Inventor(s) Salo Schmul Gronowitz et al.

It is certified that error appears in the above-identified patent and that said Letters Patent are hereby corrected as shown below:

Col. 3, line 6 in the formula, " $-H_2$" above the arrow should read -- $-H_2$ --;

Col. 8, in the formula following line 61, "$\overset{N}{\underset{C}{\|}}$" should read -- $\overset{NH}{\underset{C}{\|}}$ --

Col. 9, in the formula following line 1, "$\overset{N}{\underset{C}{\|}}$" should read -- $\overset{NH}{\underset{C}{\|}}$ --

Col. 9, line 10, "consiting" should read -- consisting --;

Col. 9, line 21, "consiting" should read -- consisting --;

Col. 10, line 4, "carobn" should read -- carbon --.

Signed and sealed this 9th day of July 1974.

(SEAL)
Attest:

McCOY M. GIBSON, JR.
Attesting Officer

C. MARSHALL DANN
Commissioner of Patents